(12) United States Patent (10) Patent No.: US 8,275,147 B2
Beavis et al. (45) Date of Patent: Sep. 25, 2012

(54) SELECTIVE SHAPING OF COMMUNICATION SIGNALS

(75) Inventors: Russell H. Beavis, Merrimack, NH (US); Derek G. Kane, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 1576 days.

(21) Appl. No.: 11/122,446

(22) Filed: May 5, 2005

(65) Prior Publication Data

US 2005/0249361 A1 Nov. 10, 2005

Related U.S. Application Data

(60) Provisional application No. 60/568,420, filed on May 5, 2004.

(51) Int. Cl.
*H04R 3/00* (2006.01)
*H04R 1/02* (2006.01)

(52) U.S. Cl. ............................. 381/92; 381/91; 381/122

(58) Field of Classification Search .................... 381/92, 381/60, 66, 93, 94.1–94.3, 94.7, 26, 314; 704/228, 233; 455/570
See application file for complete search history.

(56) References Cited

U.S. PATENT DOCUMENTS

| | | |
|---|---|---|
| 3,121,228 A | 2/1964 | Kalmus |
| 3,985,977 A | 10/1976 | Beaty et al. ................. 455/41.1 |
| 4,066,842 A | 1/1978 | Allen ............................ 381/66 |
| 4,070,553 A | 1/1978 | Hass ............................ 381/301 |
| 4,131,760 A | 12/1978 | Christensen et al. .......... 381/66 |
| 4,461,025 A | 7/1984 | Franklin ........................ 381/56 |
| 4,577,299 A | 3/1986 | Blaschke et al. .............. 367/120 |
| 4,696,043 A | 9/1987 | Iwahara et al. ................ 381/92 |
| 4,731,850 A | 3/1988 | Levitt et al. ................... 381/317 |
| 4,741,038 A | 4/1988 | Elko et al. ..................... 381/92 |
| 4,751,738 A | 6/1988 | Widrow et al. ............... 381/313 |
| 4,773,095 A | 9/1988 | Zwicker et al. .............. 381/313 |
| 4,812,812 A | 3/1989 | Flowerdew et al. ........ 340/853.6 |
| 5,335,011 A | 8/1994 | Addeo et al. ................. 348/14.1 |
| 5,394,475 A | 2/1995 | Ribic ............................ 381/316 |
| 5,479,522 A | 12/1995 | Lindemann et al. ......... 381/23.1 |
| 5,526,433 A | 6/1996 | Zakarauskas et al. ......... 381/92 |
| 5,539,859 A * | 7/1996 | Robbe et al. ................. 704/233 |
| 5,589,775 A | 12/1996 | Kuckes ......................... 324/346 |
| 5,646,524 A | 7/1997 | Gilboa ...................... 324/207.17 |

(Continued)

FOREIGN PATENT DOCUMENTS

EP 0 802 699 A2 10/1997

(Continued)

OTHER PUBLICATIONS

International Search Report with Written Opinion, dated Sep. 28, 2005, received in international patent application No. PCT/US05/015722, 11 pgs.

(Continued)

*Primary Examiner* — Devona Faulk
(74) *Attorney, Agent, or Firm* — Michelle Saquet Temple

(57) ABSTRACT

Angular discrimination between signals is described. Multiple signals are sampled with multiple signal sensors spatially separated from each other. Respective transform signals are determined that are representative of each sampled signal. If a difference between the transform signals in a given transform kernel bin is greater than a difference threshold, a first transform signal is modified by altering that kernel bin. Then the resulting modified transform signal is inverse transformed.

17 Claims, 6 Drawing Sheets

U.S. PATENT DOCUMENTS

| | | | |
|---|---|---|---|
| 5,646,525 A | 7/1997 | Gilboa | 324/207.17 |
| 5,651,071 A * | 7/1997 | Lindemann et al. | 381/314 |
| 5,721,783 A | 2/1998 | Anderson | 381/328 |
| 5,737,430 A | 4/1998 | Widrow | 381/313 |
| 5,778,082 A | 7/1998 | Chu et al. | 381/92 |
| 5,793,875 A | 8/1998 | Lehr et al. | 381/313 |
| 5,940,118 A | 8/1999 | Van Schyndel | 348/14.05 |
| 6,021,207 A | 2/2000 | Puthuff et al. | 381/330 |
| 6,173,062 B1 | 1/2001 | Dibachi et al. | 381/312 |
| 6,198,693 B1 * | 3/2001 | Marash | 367/125 |
| 6,222,927 B1 * | 4/2001 | Feng et al. | 381/94.2 |
| 6,223,090 B1 | 4/2001 | Brungart | 700/28 |
| 6,240,195 B1 | 5/2001 | Bindner et al. | 381/316 |
| 6,424,721 B1 | 7/2002 | Hohn | 381/313 |
| 6,445,799 B1 | 9/2002 | Taenzer et al. | 381/71.6 |
| 6,449,593 B1 | 9/2002 | Valve | 704/233 |
| 6,453,284 B1 | 9/2002 | Paschall | 704/208 |
| 6,529,608 B2 | 3/2003 | Gersabeck et al. | 381/110 |
| 6,731,334 B1 | 5/2004 | Maeng et al. | 348/211.12 |
| 6,813,490 B1 | 11/2004 | Lang et al. | 455/414.1 |
| 6,923,171 B2 | 8/2005 | Hammer et al. | 125/16.02 |
| 6,937,980 B2 | 8/2005 | Krasny et al. | 704/231 |
| 6,954,535 B1 * | 10/2005 | Arndt et al. | 381/60 |
| 6,978,159 B2 * | 12/2005 | Feng et al. | 455/570 |
| 7,092,877 B2 * | 8/2006 | Ribic | 704/228 |
| 7,769,186 B2 * | 8/2010 | Stokes et al. | 381/66 |
| 2002/0076073 A1 | 6/2002 | Taenzer et al. | 381/315 |
| 2002/0175820 A1 | 11/2002 | Oja et al. | 340/573.4 |
| 2003/0012392 A1 | 1/2003 | Armstrong | 381/321 |
| 2003/0138116 A1 | 7/2003 | Jones et al. | 381/94.1 |
| 2003/0198195 A1 | 10/2003 | Li | 370/260 |
| 2004/0037437 A1 | 2/2004 | Symons et al. | |
| 2005/0047620 A1 | 3/2005 | Fretz | 381/318 |
| 2005/0075149 A1 | 4/2005 | Gerber et al. | 455/575.1 |
| 2005/0077085 A1 | 4/2005 | Zeller et al. | 175/45 |
| 2005/0190937 A1 | 9/2005 | Ach-Kowalewski | 381/322 |
| 2005/0195996 A1 | 9/2005 | Dunn et al. | 381/105 |
| 2005/0226447 A1 | 10/2005 | Miller | 381/318 |
| 2005/0255843 A1 | 11/2005 | Hilpisch et al. | 455/425 |
| 2005/0264416 A1 | 12/2005 | Maurer | 340/539.13 |
| 2005/0283263 A1 | 12/2005 | Eaton et al. | 700/94 |
| 2006/0012476 A1 | 1/2006 | Markhovsky et al. | 340/539.32 |
| 2006/0224382 A1 * | 10/2006 | Taneda | 704/233 |

FOREIGN PATENT DOCUMENTS

| | | |
|---|---|---|
| EP | 0802669 A2 | 10/1997 |
| EP | 0802699 | 10/1997 |
| EP | 0 820 210 A2 | 1/1998 |
| EP | 0820210 | 1/1998 |
| EP | 0820210 A2 | 1/1998 |
| EP | 0901267 A2 | 3/1999 |
| EP | 9537026 B1 | 12/1999 |
| WO | WO 00/56070 | 9/2000 |

OTHER PUBLICATIONS

Jones, Douglas "Intelligent Hearing Aid Project", *Beckkman Institute, Univerity of Illinois at Urbana-Champaign*, Aug. 1999.

Northrup, Robert B. "Noninvasive Instrumentation and Moeasurement in Medical Diagnosis", *The Biomedical Engineering Series, CRC Press*.

* cited by examiner

SELECTIVE SHAPING OF COMMUNICATION SIGNALS

This application claims priority from U.S. provisional patent application 60/568,420, filed May 5, 2004, which is incorporated herein by reference.

FIELD OF THE INVENTION

The present invention relates to using an array of sensors, such as microphones, to focus the reception of a communication signal in a specified direction, specifically to eliminating or reducing an interfering signal in a communications signal.

BACKGROUND ART

Auditory practitioners refer to the so-called "cocktail party problem," first addressed by E. C. Cherry, in a paper entitled "Some Experiments On The Recognition Of Speech, With One And Two Ears," *Journal of the Acoustic Society of America*, vol. 25, pp. 975-79 (1953). The cocktail party problem entails the discrimination of an identified auditory source from within a background of noise and background conversation. For the hearing impaired, understanding a conversation under such conditions may be particularly taxing. Consequently, a simple method for extracting an identified source and for reducing interference from other sources is highly desirable.

SUMMARY OF THE INVENTION

Representative embodiments of the present invention provide techniques for angular discrimination of communication signals. Multiple signals are sampled with multiple signal sensors spatially separated from each other. Respective transform signals are determined that are representative of each sampled signal. If a difference between the transform signals in a given transform kernel bin is greater than a difference threshold, a first transform signal is modified by altering that kernel bin. Then the resulting modified transform signal is inverse transformed.

In a further embodiment, the inverse transformed signal is output to a user. Reducing kernel transform bins may be based on use of a comb filter function derived from the comparison of the transformed signals. The first transform signal may be modified by reducing that frequency bin to zero. The transform signals may be Fourier transforms of the communication signals. There may be two or more communication signals and/or two or more signal sensors. The communication signals may be audio signals or radio signals.

Embodiments also include techniques for suppressing off-axis noise in a sound-capture system for providing sound to a subject. Sound data is collected from at least two spatially separated microphones, and transformed to obtain a spectrum over values of frequency of the sound data for each microphone. A comb of weights is created for each value of frequency, with the weights being determined based upon a criterion applied to the phase angle associated with that frequency value. Vector products of the comb of weights are obtained with the spectrum of one or more specified microphones to form an output signal spectrum. Inverse transforms of the output signal spectrum are performed to obtain one or more output signals, which are broadcast to the subject.

In a further such embodiment, collecting sound data includes storing the sound data over the course of a collection period in a memory buffer. Transforming the collected sound data for each microphone may include performing a Fourier transform of the collected sound data. Creating a comb of weights may include defining a weight for each value of frequency which depends upon a relative phase of the value at that frequency of the phase of a first microphone relative to the value of the phase of a second microphone. Creating a comb of weights may also allow for specification of a band of angles about a non-zero value of angle of incidence within which to accept signals.

Embodiments of the present invention also include an audio system adapted to the use any of the above methods. And the system may be part of assisted listening devices, wireless telephones, speaker phones, speaker podiums, boom microphones, or any application using phased array sensors or where the power is transmitted via waveform and directionality is desired. Clear tones as well as distributed frequency signals can be processed.

DETAILED DESCRIPTION OF SPECIFIC EMBODIMENTS

Figure 1:
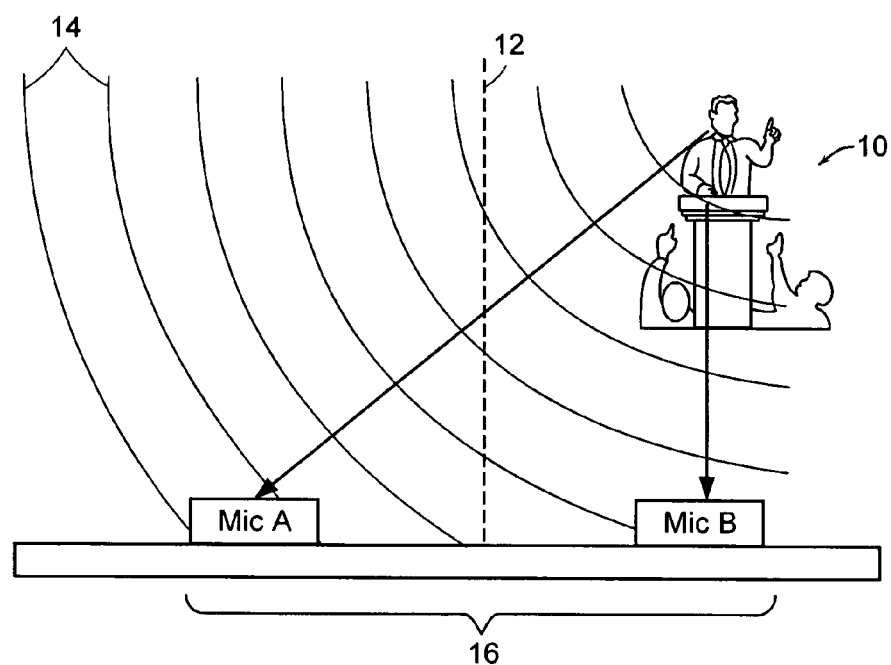
FIG. 1 shows plane waves from an acoustic source impinging onto two microphones of a microphone array.

The fundamental principle of an acoustic array, for example, an array of two microphones, is first described with reference to FIG. 1. An acoustic array generally refers to a plurality of transducers for converting mechanical vibrations to electrical signals. In FIG. 1, the acoustic array consists of two microphones. The term 'microphone' refers generally to any transducer for converting mechanical sound energy to electrical signals. While described in terms of microphones, it is to be understood that embodiments of the present invention may be practiced, equivalently, by transducing vibrations to electrical signals by other means, such as by monitoring the reflection of either light waves or ultrasound from a vibrating surface. The use of any such transduction mechanisms, now known or henceforth developed, is within the scope of the present invention as taught herein.

The principle of operation of the present invention is described herein chiefly by reference to two microphones, designated in FIG. 1 as mic A and mic B. It is to be understood that the invention taught herein may readily be generalized to a number of microphones larger than two, employing principles well known to persons of ordinary skill in the art. Similarly, while the examples presented are explicated in terms of a geometry symmetric with respect to the plane of the page, it is to be understood that the same principles may be applied with respect to the dimension transverse to the page, thereby providing directionality in three dimensions. Thus, plane of symmetry 12 is shown as a dashed line that represents the locus of points in the plane of the paper which are equidistant from mic A and mic B, may equivalently be considered to represent the plane of points equidistant from mic A and mic B in three-dimensional space. The array of mic A and mic B or any generalization thereof will be referred to herein, and in any appended claims, as a "microphone array."

The analysis presented here assumes, for the sake of simplicity, that a source of sound, designated generally by numeral 10, such as a speaker, is located far (i.e., many multiples of the microphone separation) from both mic A and mic B. In that case, the acoustic vibrations of the air intervening between source 10 and mic A and mic B may be treated as plane waves 14 emanating from source 10. Although the following description is of embodiments using two microphones, other embodiments may usefully have three or more microphones, for example, along a line of symmetry.

Figure 2:
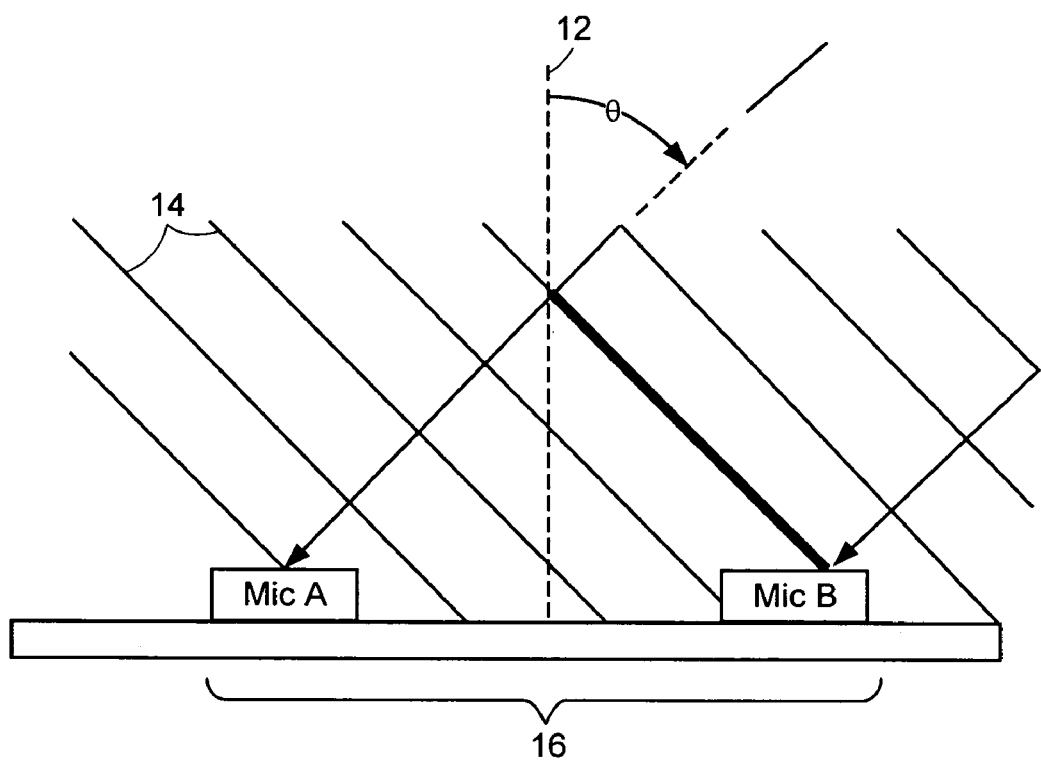
FIG. 2 shows the difference in phase of an off-axis acoustic signal impinging upon two microphones of a microphone array at an angle $\theta$ measured with respect to the axis of symmetry.

An impulse emanating from a source 10 on a line in the plane of symmetry 12 will arrive contemporaneously at mic A and mic B, while waves 14 of such a source will impinge upon mic A and mic B with equal phase. On the other hand, referring now to FIG. 2, when sound waves 14 (shown here as waves of infinite radius-of-curvature, i.e., plane waves) impinge upon microphone array 16 at an angle θ relative to plane of symmetry 12, acoustic plane waves 14 arrive at mic A after arriving at mic B, having traveled an additional distance d sin θ, where d is the spacing between the microphones. The time delay between the arrival of sound at mic A after arriving at mic B is equal to (d sin θ)/v, where v is the local speed of sound, while the phase delay is 2πf·(d sin θ)/v, where f is the frequency of the sound.

Figure 3:
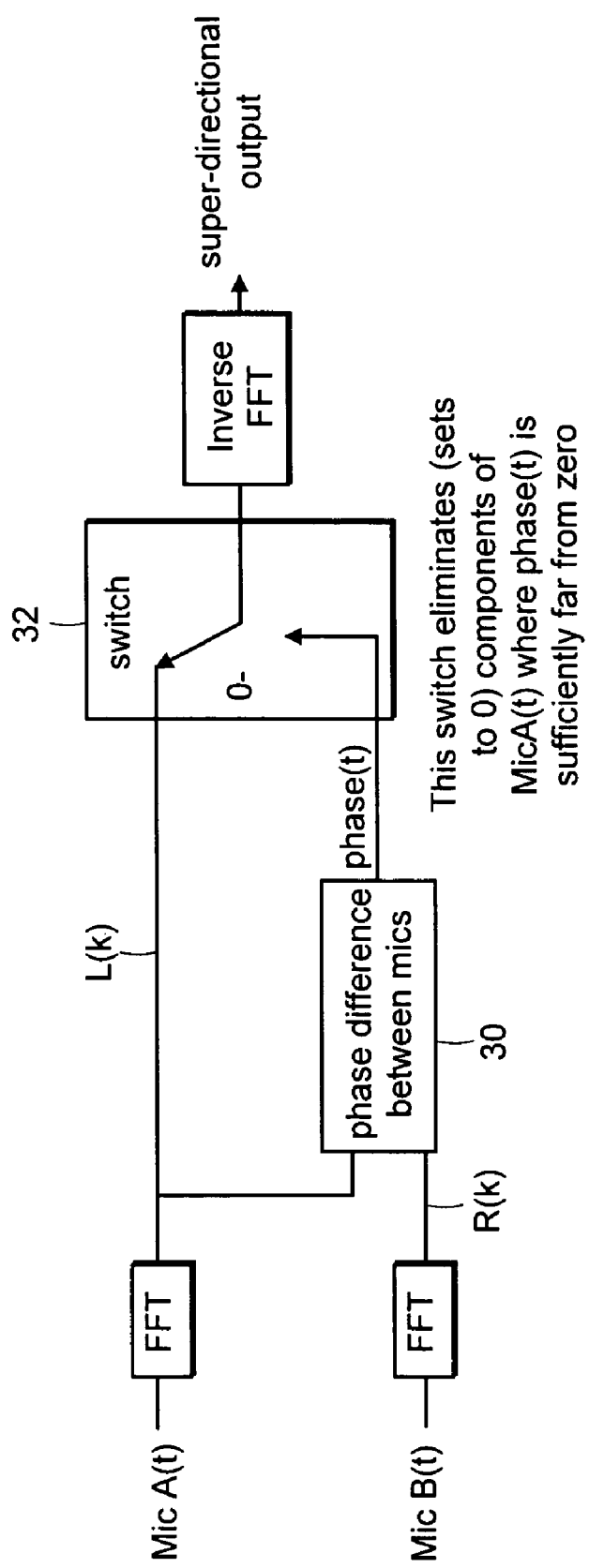
FIG. 3 shows an algorithm for eliminating signals from off-plane sources in accordance with embodiments of the present invention.

In order to enhance the directionality of sound reception at microphone array 16, sounds arriving with phase delays at mic A relative to mic B can be suppressed relative to ("common") signals arriving from sources on line of symmetry 12 and thus without phase delay. This suppression is provided, in accordance with various embodiments of the invention, as now described with reference to FIG. 3.

Microphones at mic A and mic B receive sound and produce electrical signals as a function of time, represented as mic A(t) and mic B(t). The time record of these electrical signals is buffered for a specified duration of time and is then transformed to derive the frequency components of the respective signals. The transformation indicated is that performed, in accordance with a preferred embodiment of the invention, namely a complex fast Fourier transform (FFT) which is readily implemented using known efficient algorithms, often embodied in hardware implementations. It is to be understood that various other transformations, of the form:

$$L(k) = \int_{t_0}^{t_1} mic\ A(t)K(k,t)\,dt,$$

where K(k,t) is a complex-valued transform kernel, and k is the transform variable, may be employed within the scope of the present invention. L(k) is a complex function of the transform variable k, characterized by both an amplitude (i.e., a modulus) and a phase. In the case of a Fourier transform, the kernel is $K \equiv e^{ikt}$, and k is the (angular) frequency. While other transforms may present certain advantages in terms of distortion reduction, reduction of aliasing, and computational efficiency, a Fourier transform is most readily understood in that the transform variable is a frequency, such that a frequency amplitude and phase are associated with each bin of a transform output buffer.

Phase-difference calculator 30 calculates the phase difference between the k-th frequency component of each of the left and right transform signals, L(k) and R(k). Calculation of the phase difference may proceed by any convenient method known in the art, the phase difference constituting simply the normalized value of the inner product:

$$PhaseDifference = \frac{\overline{L(k)} \cdot R(k)}{\|L(k)\|\|R(k)\|}$$

where the over-bar denotes a complex conjugate value.

The phase difference for each frequency bin k is then used, in 'switch' 32, to generate a comb filter function C(k), which is applied, as a mask, to one of the transform signals, to create an output signal spectrum: S(k)=C(k)·L(k). In one embodiment of the invention, the comb filter assumes a value of unity (=1) when the phase difference is less than a specified threshold phase angle $\Theta_t$, indicating that the signal at that frequency derives predominantly from a sound source close to the plane of symmetry 12. The value of threshold phase angle $\Theta_t$ may be set in hardware or software, or, alternatively, may be made accessible to user control such that a user may wider or narrow the directionality of the resultant signal. Where the comb filter in not set to unity, the mask otherwise assumes a zero value. One particularly efficient approach to calculating C(k) is described by the following sequence:

$$T(k) = \overline{L(k)} \cdot R(k)$$

$$C(k) = \begin{cases} 1 & |Im\{T(k)\}| \leq |Re\{T(k)\}| \cdot \tan\Theta_t \\ 0 & \text{otherwise} \end{cases}$$

This implementation determines whether the phase angle is less than the threshold without requiring division or evaluation of trigonometric functions. In accordance with a further embodiment of the invention, the band of angles for which frequency components are kept may be specified with respect to a central angle other than zero, such that the acceptance angle of the system may be steered electronically.

The signal spectrum S(k) is then inverse transformed, according to the inverse transformation of the transformation that created transform spectra L(k) and R(k), to create a signal, S(t), referred to herein as the "super-directional output," which is broadcast to the user, such as by applying it to one or more output speakers or earphones.

Various generalizations of the foregoing teachings are within the scope of the present invention. For one thing, amplification (linear, or otherwise) and other conditioning (filtering, squelching, shaping, etc.) of signals is well known to persons of ordinary skill in the art, and its implementation within the scope of the invention is assumed. Filtering may be lowpass, or bandpass, or tailored to a user, indeed, any of these features may advantageously be customized for the comfort and convenience of a specified user.

Moreover, the comb filter function is not limited to a binary-valued function, and the response as a function of phase angle (i.e., of source angle with respect to the plane of symmetry) may be tapered and otherwise shaped for a more natural effect. The comb function may also depend on various other variables in addition to phase difference, for example, the comb function may have a prefigured frequency dependence, or may allow the angle of acceptance to be steered electronically with respect to the axis of symmetry. Additionally, the signal spectrum S(k) is not limited to derivation from a single microphone as shown, but may be based on an admixture of both transform spectra L(k) and R(k), as long as C(k) is a function of the relative phase of L(k) and R(k). In a further embodiment of the invention, the threshold phase angle $\Theta_t$ may be a function of frequency $\Theta_t(k)$, in order to provide for an angular discrimination that is frequency-independent (since the phase difference in arriving signals is proportional to frequency for a given θ), or otherwise tailored to provide a more natural-sounding angular roll-off.

Various algorithmic embodiments of the foregoing principles are within the scope of the present invention. Instead of using an Inverse FFT (or other inverse transform) to create the super-directional output S(t), phase-mask switch 32 may be used to enable or disable (or modulate the value of) bandpass filters of an array. The outputs of the array of bandpass filters may then be summed to create S(t).

In yet another embodiment of the invention, signal data mic A(t) and mic B(t) are maintained in a rolling buffer window over a relative large interval, say, of 2048 samples, while the transform/inverse transform is performed at a higher rate after every 128 (for example) samples, with only the newest 128 samples, for example, from the inverse FFT used to produce the super-directional output S(t). This advantageously reduces delay between microphone outputs and S(t) while maintaining a history of phase differences over a longer interval.

Figure 4:
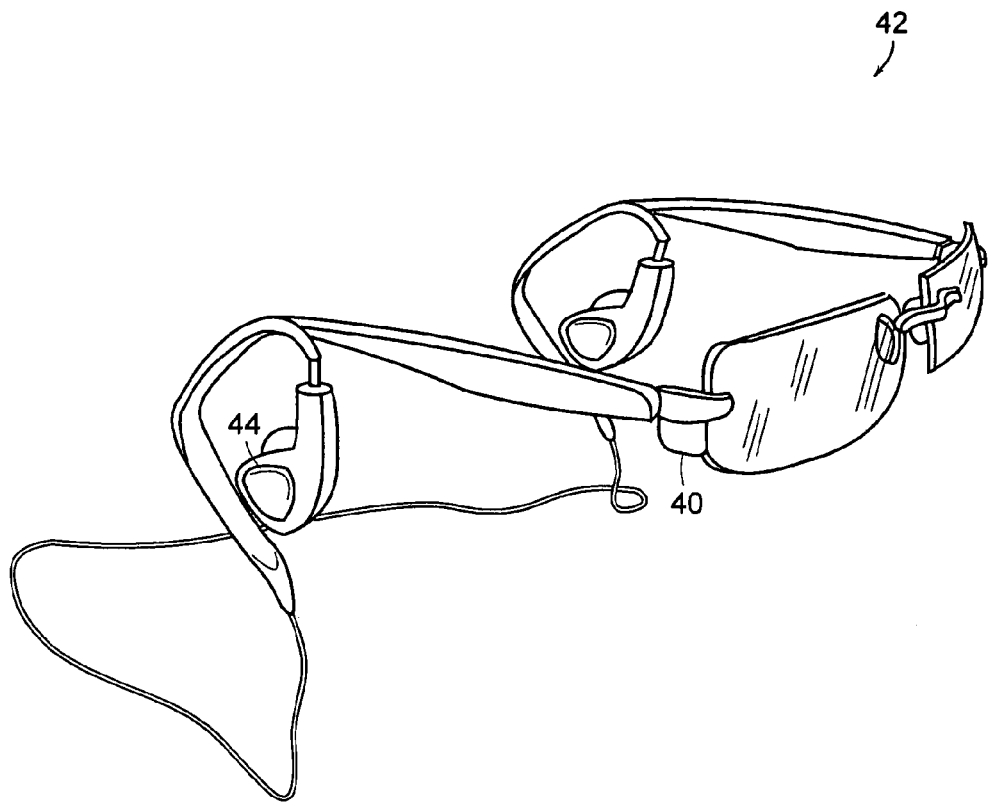
FIG. 4 is a perspective view of a microphone array for assisted hearing in accordance with an embodiment of the present invention.

The principles and algorithms described in the foregoing discussion may be applied, in accordance with embodiments of the present invention, to assistive listening devices (ALDs) designed to improve audibility in specific listening situations, particularly, for individuals suffering from various sorts of hearing impairments. One embodiment is shown in the perspective view of FIG. 4, where microphones 40 are disposed in the frame of a pair of eyeglasses 42 and the super-directional signal S(t) applied, with suitable amplification, to earphones 44.

Specific embodiments of such a hearing assist device may have one or more of the following options:

- A button or a jogwheel to enable/disable directionality (i.e. toggle between a "directional" mode and an "amplify everything" mode)
- A slide or a jogwheel to make the device more/less directional during actual use (algorithm)
- Voice prompts for when leaving/entering directional mode in the device
- A rechargeable battery, for example, with inductive charging (as in an electric toothbrush)
- Voice/speech actuation (e.g., for ON/OFF, directional mode ON/OFF or amount of directionality)
- An eyeglass form factor
- An earpiece form factor
- An in-the-ear form factor
- The Digital Signal Processor (DSP) may be in a separate case with wireless communications between microphones and speakers
- Tunability of gain vs. frequency to match a person's hearing loss
- A USB (or other) interface to a PC to support general programmability.

The principles and algorithms described in the foregoing discussion may also be applied, in accordance with further embodiments of the present invention, in contexts where directional acoustic sensitivity is desirable so as to select a specified source of acoustic signal from amidst background sources or noise.

It is desirable for some systems, in particular sound systems, to keep the delay between receiving the input signal and broadcasting the super-directional output to less than a particular threshold, e.g., ~50 ms for sound systems. Conversely, specific implementations of an algorithm according to the above teachings may need a relatively long time trace. This makes the frequency bins of the Fourier transform small enough for the algorithm to provide meaningful discrimination. In one specific embodiment a time trace of around 85 ms is used.

Figure 5:
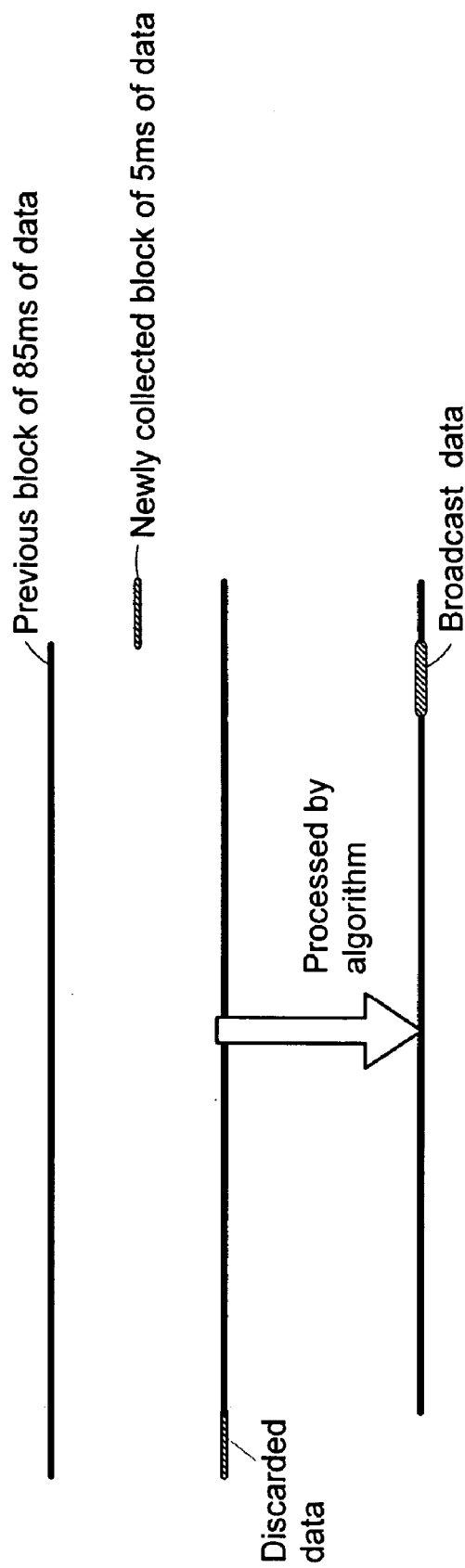
FIG. 5 shows how a specific embodiment may record data in small blocks of time.

To satisfy both of the above considerations, a specific embodiment may record data in small blocks of time, e.g., ~5 ms for audio. As shown in FIG. 5, the time trace then is updated with the latest 5 ms of data, and the oldest 5 ms is discarded and the algorithm can be applied to the iteratively updated data. Broadcast of the super-directional signal is performed on blocks of data equal in length to the new data, keeping in mind that the broadcast comes from the data after the algorithm has processed it. Rather than broadcast the last 5 ms of data from the processed data, data from the interior of the processed data set may actually be broadcast. This may minimize artifacts caused by the edge effects of the data.

Figure 6:
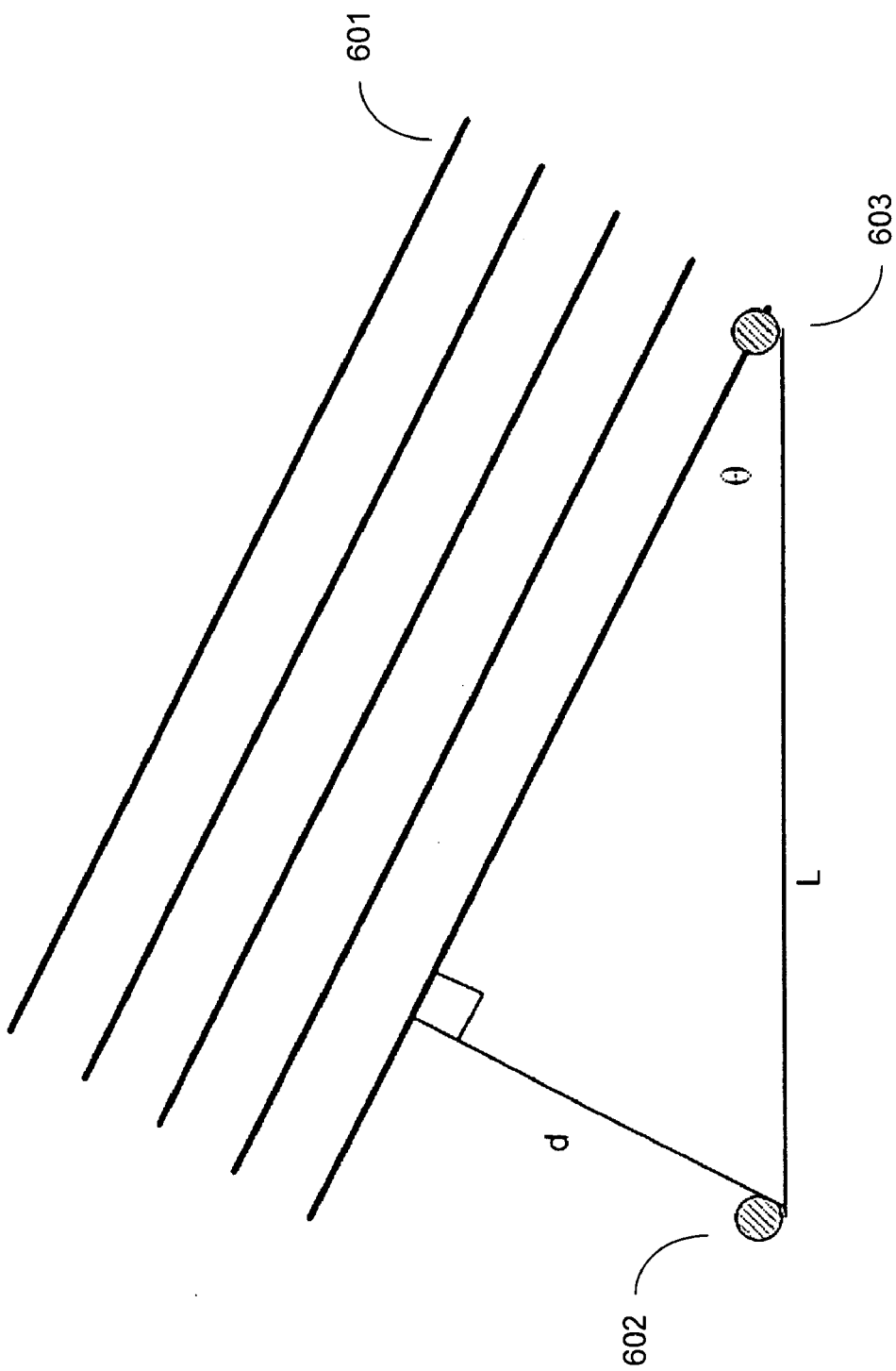
FIG. 6 illustrates the physical principle used by embodiments of the present invention.

The algorithm uses the physical principal shown in FIG. 6. An off-axis signal 601 will approach the sensors approximately in a plane wave angled with respect to the sensors 602 and 603. This angle θ means that the signal 601 must travel an additional distance, d, to reach sensor 603 as compared to sensor 602.

$$d = L \cdot \tan \theta$$

This translates into a time-delay between when the signal 601 is received by the two sensors 602 and 603. This time delay creates a phase difference, $\phi$, which is defined by:

$$\phi(\omega) = \omega \cdot \tau$$

This phase difference allows signals approaching the sensors from unacceptable angles to be rejected. However, the phase angle increases with frequency, so at a high enough frequency, it becomes impossible to interpret a phase difference between two signals as a time delay, i.e., after $\phi(\omega)$ is greater than $2\pi$. Thus it may make sense in some embodiments to stop discriminating between signals when the phase threshold is somewhere between $\pi/4$ and $\pi/2$.

For example, assume that audio signals in a ±5° wedge directly in front of the sensors are acceptable, and those outside this wedge are not. For an assisted hearing device application, the nominal separation between the microphones may be 0.15 m. The speed of sound is roughly 300 m/s, so the maximum acceptable time delay between the two signals is:

$$\tau_{max} = \frac{d}{c} = \frac{0.15 m \cdot \tan 5°}{300 m/s} \approx 44 \mu s$$

Assuming that discrimination occurs only when the maximum acceptable phase is less than $\pi/4$, then the maximum discriminable frequency is $$\omega_{max} = \frac{\pi}{2 \cdot \tau_{max}} \approx 36,000 \frac{rad}{s} (\approx 5700 Hz)$$

Using more than two pairs of sensors will extend this range and simultaneously improve discrimination at higher frequencies. The time delay above is proportional to the sensor separation, and if one or more additional sensors is placed between the existing sensors, then another set of time delay measurements is available. The ensemble of time delays can be evaluated between all of the sensors to provide better estimates of the angle of the source of the signal received in any frequency bin.

The foregoing embodiments simply zeroed any information from a frequency bin that appeared to come from an off-axis source. But this may cause some artifacts in audio application broadcast signals. Thus in some embodiments, it may be advantageous to attempt to reconstruct the missing frequency information. Examples of approaches along those lines include:

Interpolating the missing frequencies using non-zero neighbors' data; and

Using the characteristics of the signal to intelligently reconstruct, e.g., for speech signals use the typical phase/magnitude relations of the spectra to fill in the blanks.

It should be appreciated that there are many real world applications where it is also desirable to shape the transform of a communication signal transform as well as to provide angular discrimination. One typical case is for a hearing aid, where the user's hearing loss varies with frequency. This can be compensated to some extent by amplifying the frequencies with greater hearing loss more than other frequencies. The angular discrimination techniques above can also be used to selectively amplify frequencies, while determining the frequency bins that should be processed. Although Fourier transforms provide an example of this principle, other transforms have applications requiring selective amplification of transform bins. The angular discrimination algorithm could provide selective amplification for these transforms as well. Examples of applications where these techniques are useful include without limitation wireless communication towers, wireless telephones, speaker phones, speaker podiums, boom microphones, or any application using phased array sensors or where the power is transmitted via waveform and directionality is desired. Clear tones as well as distributed frequency signals can be processed.

Embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method of angular discrimination between signals, the method comprising:
    sampling a plurality of signals with at least three non-coliinear microphones spatially separated from each other;
    determining respective transform signals representative of each sampled signal;
    if a phase difference between the transform signals within a transform kernel bin is greater than a phase difference threshold, modifying a first transform signal by altering the kernel bin; and
    inverse transforming the modified transform signal.

2. A method according to claim 1, further comprising outputting the inverse transformed signal to a user.

3. A method according to claim 1, wherein modifying a first transform signal by altering the kernel bin further comprising reducing the transform kernel bin using a comb filter funtion.

4. A method according to claim 1, wherein modifying a first transform signal by altering the kernel bin further comprising reducing the transform kernel bin to zero.

5. A method according to claim 1, wherein the transform signals are Fourier transforms of the signals.

6. A method according to claim 1, wherein there are two signals.

7. A method according to claim 1, wherein there are two signal sensors.

8. A method according to claim 1, wherein the signals are audio signals.

9. A method according to claim 1, wherein the signals are radio signals.

10. An audio system adapted to use the method according to any of claims 1-9.

11. An audio system according to claim 10, wherein the system is part of an assisted listening device.

12. An audio system according to claim 10, wherein the system is part of a wireless telephone, a speaker phone, a speaker podium, or a boom microphone.

13. A method of angular discrimination between signals, the method comprising:
    sampling a plurality of sound signals with at least three non-collinear microphones spatially separated from each other;
    determining respective transform signals representative of each sampled signal by performing a Fourier transform of each sampled signal;
    if a phase difference between the transform signals within a transform kernel bin is greater than a phase difference threshold, modifying a first transform signal by reducing the transform kernel bin to zero; and
    inverse transforming the modified transform signal.

14. A method according to claim 13, wherein the inverse transformed signal is output to a user.

15. A method according to claim 13, wherein modifying a first transform signal by altering the kernel bin further comprising reducing the transform kernel bin a comb filter function.

16. A method according to claim 13, wherein the signals are audio signals.

17. A method according to claim 13, wherein the signals are radio signals.

* * * * *